| | | |
|---|---|---|
| United States Patent [19] | [11] Patent Number: | 4,861,654 |
| Glover | [45] Date of Patent: | Aug. 29, 1989 |

[54] MULTILAYER CARRIER FILMS

[75] Inventor: Paul E. Glover, Taunton, England

[73] Assignee: BCL Limited, Bridgewater, United Kingdom

[21] Appl. No.: 120,427

[22] Filed: Nov. 13, 1987

[30] Foreign Application Priority Data

Nov. 14, 1986 [GB] United Kingdom ................. 8627292

[51] Int. Cl.$^4$ ............................................. B32B 29/34
[52] U.S. Cl. .................................... 428/287; 428/284;
428/474.4; 428/474.9; 428/35.2; 428/35.4
[58] Field of Search ................. 428/36, 284, 286, 287,
428/474.4, 474.9, 246, 252, 282, 475.8, 476.1,
423.5

[56] References Cited

U.S. PATENT DOCUMENTS

| | | | |
|---|---|---|---|
| 4,243,074 | 1/1981 | Strutzel et al. | 428/474.9 |
| 4,303,711 | 12/1981 | Erk et al. | 428/36 |
| 4,537,817 | 8/1985 | Guillaume | 428/287 |
| 4,568,580 | 2/1986 | Ghirardello et al. | 428/35 |
| 4,569,884 | 2/1986 | Weinand et al. | 428/287 |
| 4,647,483 | 3/1987 | Tse et al. | 428/474.7 |
| 4,723,579 | 2/1988 | Hyado et al. | 428/36 |
| 4,729,926 | 3/1988 | Hotetes et al. | 428/474.7 |
| 4,735,855 | 4/1988 | Wolford et al. | 428/474.4 |

FOREIGN PATENT DOCUMENTS 0168053  1/1986  European Pat. Off. .

Primary Examiner—James J. Bell
Attorney, Agent, or Firm—Watson, Cole, Grindle & Watson

[57] ABSTRACT

The invention is concerned with a multilayer carrier film for supporting a fluid synthetic resin composition impregnated fibrous mat against a surface, for example the inside surface of a pipe, during the curing of the resin. The film comprises a nylon layer (preferably nylon 6) having on one surface a layer of a polyamide copolymer having a softening point at a temperature below 170° C. (for example a nylon 6/12 copolymer in which the nylon 12 component lies in the range from 35 to 55% by weight) and on the other surface a layer of a weldable synthetic plastic composition, for example a polyethylene ionomer. The fibrous mat which may consist of polyester, acrylic or polypropylene fibres is heat-bonded to the polyamide copolymer layer of the multilayer film. The film is resistant to delamination by the resin composition.

11 Claims, No Drawings

MULTILAYER CARRIER FILMS

BACKGROUND OF THE INVENTION

1. Field of the Invention

This invention is concerned with multilayer carrier films for supporting a fluid synthetic resin composition against a solid surface during curing of the resin.

2. The Prior Art

In the reconditioning of pipes, particularly sewer pipes laid below ground level, it is known to apply a layer of a liquid synthetic resin composition to the inner surface of the pipe and then to cure the resin to form an inert solid lining to the pipe. The resin is conveniently applied in the form of a fibrous mat which is impregnated with a curable resin composition and which is securely attached on one side to an impermeable carrier film. The resin composition-impregnated mat is placed next to the inner surface of the pipe with the carrier film on the outside and pressure is applied from the film side causing the mat to conform intimately with the surface. The resin is then cured. The fibrous mat serves as a reinforcing agent in the cured product.

In one known specific method of reconditioning a pipe, a mat of polyester fibres is secured face-to-face with a carrier film of polyvinyl chloride or of polyurethane. The latter may be formed in situ by melt coating. The combination is then converted into an elongated bag by stitching, and the joint and stitching are protected on the carrier film side by a patch of the same material as the carrier film, secured to the film surface by heat, a solvent or an adhesive. The mat is then impregnated with a composition consisting of an unsaturated polyester resin in a styrene base. The mouth of the bag, with the carrier film on the outside, is fixed to one end of the pipe and the closed end of the bag is pulled through the pipe so that the bag everts and the resin-impregnated mat lies next to the pipe wall, with the carrier film now on the inside of the bag. Hot water is then introduced under pressure into the inside of the bag for the purpose of pressing the mat against the pipe wall and for curing the resin.

In another method, as described in European Patent Publication No. 0168053, a polyester resin incorporating a light-activatable catalyst is used for the impregnation of a mat of acrylic or polypropylene fibres and the resin is cured when the assembly of impregnated mat and carrier film is within the pipe by exposing it to an appropriate light, for example ultra violet light. In this method it is necessary for the carrier film and the mat to permit the passage of the light to the resin to effect the curing.

In the operation of the above two methods it is necessary to impregnate the mat shortly before use and often on site, since during storage the resin composition rapidly attacks the polyvinyl chloride or polyurethene carrier film, causing it to become weakly attached to or even detached from the mat. Such a detachment could give rise to serious difficulties of application if detachment takes place before curing of the resin. A detachment after curing of the resin could cause serious obstruction problems, particularly if the pipe is below ground level. Impregnation of the mat on site is difficult and inconvenient.

SUMMARY OF THE INVENTION

The present invention is concerned with an improved carrier film which permits assemblies of resin-impregnated mats with the carrier film in the form of elongated bags to be factory manufactured and stored for convenient periods before use in reconditioning pipes.

According to the present invention, a multilayer carrier film for supporting a fluid synthetic resin composition-impregnated fibrous mat against a surface during the curing of the resin comprises a layer of a nylon which is impermeable to the resin composition, a layer of a polyamide copolymer having a softening point at a temperature below 170° C. on one surface of the layer of a nylon, and a layer of a weldable synthetic plastic composition on the opposite surface of the layer of a nylon.

The weldable synthetic plastic composition may be any suitable plastic composition which is strongly adherent to the nylon layer and which is conveniently heat, solvent or adhesive weldable to permit patches to be applied over joints and stitching necessarily formed in the conversion of the sheet material into elongated bags. Also, it is occasionally necessary to make an exploratory aperture into the bag wall to investigate the state of the layers and such apertures are subsequently plugged and sealed by a patch of the plastic composition. The weldable composition may be polyethylene, polypropylene, an ethylene/vinyl acetate copolymer, an ethylene/acrylic acid copolymer, an ethylene/ethyl acrylate copolymer, a polyurethene, a polycarbonate, or polyvinyl chloride. A preferred plastic composition is a polyethylene ionomer, and more preferably an ionomer based upon zinc ions such as is marketed by Du Pont de Neumors & Company of the United States of America under the trade mark "Surlyn".

The preferred nylon for the nylon layer is nylon 6. The fluid synthetic resin composition is conveniently an unsaturated polyester resin in a styrene base which may contain either a heat activatable or a light activatable catalyst to bring about curing of the resin at the appropriate time.

The fibrous mat may be formed from a woven or non-woven fabric or it may be a felt. The fibres are conveniently synthetic plastic fibres such as polyester fibres, or if a light activatable catalyst is used with the resin, then fibres which transmit light readily, such as acrylic fibres or polypropylene fibres, may be used.

The nylon layer is impermeable to the fluid synthetic resin composition and, as a consequence, there is no risk of the layer of the weldable synthetic plastic composition being attacked and swollen by the resin composition with the further risk of delamination. The nylon layer, however, has a relatively high softening point which makes it impracticable to heat weld it to a mat of synthetic plastic fibres. It has been found that a polyamide copolymer, such as the copolymer nylon 6/12, has a softening point below 170° C. which allows it, in the form of a layer, to be readily secured by heat-bonding to a mat of synthetic plastic fibres, as well as being readily and securely bondable to the nylon 6 layer. A preferred copolymer is nylon 6/12 in which the nylon 12 lies in the range from 35 to 55% by weight.

The multilayer film in accordance with the invention may be formed by lamination of the component layers or by co-extrusion of the layers while in a molten form. Further, the adhesion of the nylon layer with either the copolymer layer or the layer of the weldable synthetic plastic composition, or both, may be enhanced by introducing between the layers a bonding layer of a bonding agent such as a polyethylene graft maleic anhydride copolymer.

The invention also includes a multilayer carrier film as described when bonded by the polyamide copolymer layer to a fibrous mat and, more particularly, to a resin-impregnated fibrous mat.

The invention still further includes a method of manufacturing a multilayer carrier film for supporting a fluid synthetic resin composition-impregnated fibrous mat against a surface during the curing of the resin comprising bringing together into intimate surface adherent contact a layer of a nylon which is impermeable to the synthetic resin with, on one side, a layer of a polyamide copolymer having a softening point at a temperature below 170° C., on the other side, a layer of a weldable synthetic plastic composition.

The invention will now be more specifically described by reference to the following Examples.

EXAMPLES 1 TO 4

Three separate molten streams of nylon 6, a polyethylene ionomer based upon zinc ions ("Surlyn") and a polyamide copolymer consisting of 49% nylon 6 and 51% nylon 12 by weight were coextruded through a slot die with the nylon 6 stream as the middle component.

The combination was cast onto a chill roll to form a multilayer film. The size of the die and processing parameters were so arranged that in the final film the thickness of the layers were polyamide copolymer-30 microns, nylon 6–30 microns and polyethylene ionomer-150 microns.

The multilayer film was then pressed into contact with a mat of acrylic fibres, 4.5 millimeters thick, (polyamide surface to mat) under a force of 410,000 pascals at an interface temperature of 140° C. for 5 seconds. On cooling it was found that the film was firmly secured to the mat.

The degree of bonding between the film and the mat was measured by cutting a strip of the film/mat combination, 10 millimeters in width, and measuring the force required to peel the film from the mat.

Another strip sample was cut from the combination and the mat was impregnated with a liquid synthetic resin composition consisting of an unsaturated polyester resin in styrene which also included an ultra violet light activated curing catalyst. The sample was stored for seven days (168 hours) in the dark and then it was examined for any visible change. There was no sign of any swelling or deterioration in the polyethylene ionomer layer or failure of the bond between the polyethylene ionomer and the nylon 6 layer. This sample was then placed into water at 25° C. and subjected to the action of ultra violet light until the resin had cured to form a hard mass firmly attached to the multilayer film. The strength of the bond between the film and the cured resin mass was measured by determining the force required to peel the film from the mass. The results obtained are shown in the accompanying Table. For a satisfactory commercial product a peel strength of least 1 kilogram/10 millimeters wide strip is required for the adhesion of the film to the mat of fibres and to the cured resin mass.

The procedure was repeated (Example 2) but with the change that polyester fibres were used in the mat, the resin contained a heat activated curing catalyst and was cured by immersion in water at 80° C. The storage time was 4 hours.

The procedure of Example 1 was further repeated (Example 3) except that a different polyamide copolymer was used and a change was made in the thickness of the polyethylene ionomer layer.

The procedure of Example 3 was repeated (Example 4) except that a polyethylene graft maleic anhydride copolymer was co-extruded with the other layers between the nylon 6 and the polyethylene ionomer.

As in Example 1, visual inspection of the film/mat combination in Example 2 to 4 after the storage period, showed no sign of deterioration of the polyethylene ionomer layer as would be expected if the resin had migrated from the mat to that layer.

In all Examples the strength of the bonds between the film and the mat or resin mass was found to be well above that required for satisfactory commercial applications.

Since the multilayer film in accordance with the invention is resistant to delamination by the resin composition secured to it, elongated bags formed from the film in combination with a fibrous mat impregnated with resin may be made up conveniently in a factory, put into stock and taken to a site as required. This is considerably more convenient than having to apply the resin just before use of the combination such as on site to avoid possible delamination problems.

When the multilayer film in accordance with the invention transmits light, it can be used in circumstances where a light activatable curing catalyst is incorporated within the resin.

TABLE

| Example No. | Polyamide Copolymer (Monomer % by weight) | | Multilayer Film layer thickness (microns) | | | | Mat Fibres | Activator for Catalyst | Peel Strength Mat from Film (Kgs/ 10 mms) | Storage Time (hours) | Peel Strength Cured Resin Mass from Film (Kgs/ 10 mms) |
| --- | --- | --- | --- | --- | --- | --- | --- | --- | --- | --- | --- |
| | Nylon 6 | Nylon 12 | Copolymer | Nylon 6 | Graft Mod. PE | "Surlyn" | | | | | |
| 1 | 49 | 51 | 30 | 30 | 0 | 150 | A | UV | 3.2 | 168 | 4.2 |
| 2 | 49 | 51 | 30 | 30 | 0 | 150 | PE | H 80° C. | 2.7 | 4 | 3.3 |
| 3 | 60 | 40 | 30 | 30 | 0 | 200 | A | UV | 2.9 | 168 | 3.6 |
| 4 | 60 | 40 | 30 | 30 | 10 | 190 | A | UV | 3.1 | 168 | 3.9 |

A = acrylic
PE = polyester
UV = ultra violet light
H = heat

I claim:

1. A multilayer carrier film for supporting a fibrous mat which is impregnated with a curable fluid synthetic resin composition against a surface during curing of said resin, said multilayer carrier film comprising a base layer of a nylon which is impermeable to said resin composition, said base layer having first and second opposite surfaces; a first adherent layer on said first surface of said base layer, said first adherent layer being composed of a polyamide copolymer having a softening point at a temperature of below 170° C. and being sealable to said fibrous mat with the application heat and pressure; and a second adherent layer on said second surface of said base layer, said second adherent layer being composed of a weldable synthetic plastic composition to which patches of weldable material may be secured to cover joints and breaks in said second adherent layer.

2. A film as claimed in claim 1, wherein said weldable synthetic plastic composition is a polyethylene ionomer.

3. A film as claimed in claim 1, wherein nylon is nylon 6.

4. A film as claimed in claim 1, wherein weldable synthetic plastic composition is an ethylene/vinyl acetate copolymer, an ethylene/acrylic acid copolymer, a polyurethane, a polycarbonate or polyvinyl chloride.

5. A film as claimed in claim 1, wherein the polyamide copolymer is nylon 6/12 copolymer.

6. A film as claimed in claim 5, in which the amount of nylon 12 in the copolymer lies in the range from 35 to 55% weight.

7. The combination of a fibrous mat and a multilayer carrier film which supports said fibrous mat, said multilayer carrier film comprising: a base layer of nylon which is impermeable to a curable fluid synthetic resin composition, said base layer having first and second opposite surfaces; a first adherent layer on said first surface of said base layer, said first adherent layer being composed of a polyamide copolymer having a softening point at a temperature of below 170° C.; and a second adherent layer on said second surface of said base layer, said second adherent layer being composed of a weldable synthetic plastic composition to which patches of weldable material may be secured to cover joints and breaks in said second adherent layer; said fibrous mat being bonded to said first adherent layer.

8. The combination as claimed in claim 7, wherein said fibrous mat comprises polyester, polyacrylic or polypropylene fibers.

9. The combination as claimed in claim 8, wherein said fibrous mat is impregnated with a synthetic fluid resin composition.

10. A film as claimed in claim 1, when converted into an elongated bag.

11. A multilayer carrier film as claimed in claim 1, wherein said first adherent layer is in contact with said first surface of said base layer.

* * * * *